United States Patent
Beckett et al.

(10) Patent No.: US 10,135,893 B2
(45) Date of Patent: Nov. 20, 2018

(54) SYSTEM AND METHOD FOR CONTROLLING OUTPUT OF A FUNCTION IN RESPONSE TO MEDIA CONTENT

(71) Applicant: NBCUniversal Media, LLC, New York, NY (US)

(72) Inventors: William Beckett, Marlboro, NJ (US); Howard Shirokmann, Point Pleasant, NJ (US); Sanjay Macwan, Marlboro, NJ (US)

(73) Assignee: NBCUNIVERSAL MEDIA, LLC, New York, NY (US)

( * ) Notice: Subject to any disclaimer, the term of this patent is extended or adjusted under 35 U.S.C. 154(b) by 540 days.

(21) Appl. No.: 14/557,251

(22) Filed: Dec. 1, 2014

(65) Prior Publication Data

US 2016/0156712 A1    Jun. 2, 2016

(51) Int. Cl.
    *H04L 29/08*    (2006.01)
    *H04L 29/06*    (2006.01)

(52) U.S. Cl.
    CPC .......... *H04L 65/60* (2013.01); *H04L 65/4015* (2013.01); *H04L 65/604* (2013.01)

(58) Field of Classification Search
    CPC ....................................................... H04L 65/60
    See application file for complete search history.

(56) References Cited

U.S. PATENT DOCUMENTS

| | | | |
|---|---|---|---|
| 2009/0149125 A1* | 6/2009 | Slotznick | H04M 1/215 455/3.05 |
| 2011/0247042 A1* | 10/2011 | Mallinson | G06F 17/30026 725/86 |
| 2012/0227073 A1* | 9/2012 | Hosein | H04N 21/4126 725/60 |
| 2014/0059587 A1* | 2/2014 | Davis | H04M 1/72533 725/32 |
| 2014/0196077 A1* | 7/2014 | Gordon | H04N 21/8358 725/31 |
| 2014/0303991 A1* | 10/2014 | Frank | G06Q 30/0251 705/2 |

* cited by examiner

*Primary Examiner* — Nicholas R Taylor
*Assistant Examiner* — Sanjoy Roy
(74) *Attorney, Agent, or Firm* — Lee, Hong Degerman, Kang & Waimey PC

(57) ABSTRACT

Provided is a method for controlling output of a function in response to media content, the method comprising obtaining function information from another party, the function information comprising a content trigger and information related to a particular function associated with the content trigger, receiving the media content when it is reproduced by an external output device, and causing an external terminal to perform the particular function when the content trigger is included in the reproduced media content.

26 Claims, 4 Drawing Sheets

SYSTEM AND METHOD FOR CONTROLLING OUTPUT OF A FUNCTION IN RESPONSE TO MEDIA CONTENT

Providing interactive and enhanced elements with the distribution of media content increases the value of the content and the experience of the consumer of the media content. The interactive elements may be enhanced if they are specialized for the particular media content being viewed. However, systems for providing interactive elements may require dedicated devices and be inflexible to changes to desired outputs or the particular media content being viewed.

The ability for content providers to dynamically craft and associate particular interactive elements and experiences with specific media content while maintaining flexibility for scaling and dynamic iteration, especially with respect to specifically identified portions or points of interest within the media content, may be advantageous. Thus, there is a great need for a solution to effectively distribute media content which provides for the ability to present interactive and enhanced media content consuming experiences for the user.

SUMMARY

Embodiments of the present disclosure include a system and method for controlling the output of a function in response to media content, wherein a particular function is performed in response to the recognition of the output of a corresponding media content. The particular function may be defined in advance by a distributor of the media content, and the information regarding the particular function may be distributed separately from the distribution of the media content.

Embodiments of the present disclosure include identifying a content trigger within media content to be distributed, wherein the content trigger is associated with the particular function to be performed when the content trigger is recognized during output of the media content. Other embodiments include creating a content trigger and inserting the content trigger into the media content, wherein the content trigger is recognized by an external terminal during output of the media content.

In certain embodiments, a provider of the media content may store information of the media content, identifying information of a content trigger, and information of a particular function associated with the content trigger in a memory to be distributed to media content distributors or media content consumers. The stored information may be updated at any time by the media content provider, and the updated information may be pushed to media content consumers, or the updated information may be stored and made available for a pull update by the media consumer.

Embodiments of a system of the present disclosure include external terminals which are configured to perform one or more of a variety of functions, wherein the external terminal is controlled by a controller. The external terminals may connect wirelessly to a controller of a controlling terminal. In some embodiments, the controller is included in the controlling terminal which is configured to recognize a content trigger during output of the media content by an output device. The controlling terminal may be configured to control the external terminal to perform the particular function associated with a content trigger when the content trigger is recognized.

According to an embodiment, a method of the present disclosure includes identifying a content trigger in media content to be distributed, associating a particular function with the content trigger wherein the particular function is to be performed by an external terminal in response to the content trigger during output of the media content, storing function information comprising the content trigger and the particular function, providing the stored function information to another party, and providing the media content including the content trigger to an external output device to permit output of the media content on the external output device.

According to another embodiment, a method of the present disclosure includes obtaining function information related to the media content from another party, the function information comprising identifying information of a content trigger included in the media content and information related to a particular function associated with the content trigger, obtaining input information of the media content being output by an external output device, recognizing the content trigger included in the output media content, and causing an external terminal to perform the particular function in response to recognizing the content trigger.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for controlling external terminal devices or other dedicated devices to perform a particular function in response to recognizing the output of media content, wherein the media content may include a content trigger which is associated with the particular function.

Figure 1:
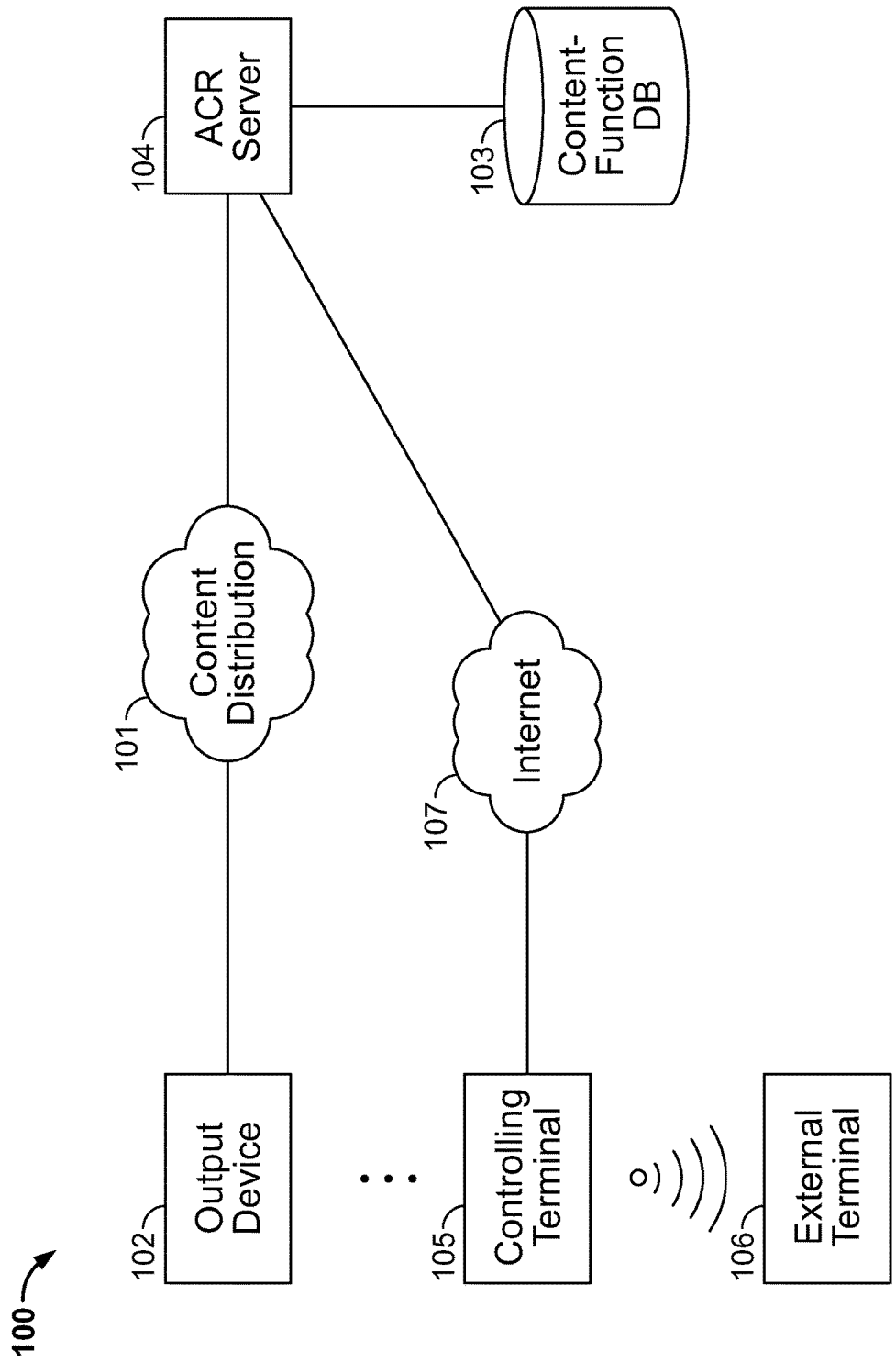
FIG. 1 is an illustration of a system for controlling output of a function in response to media content in accordance with an embodiment of the present disclosure.

Referring now to FIG. 1, an embodiment of a system 100 for controlling output of a function in response to media content is shown. The system includes a content distribution system 101 which provides media content for distribution to media consumers or other distribution channels. In some embodiments, the content distribution system 101 may include live television broadcast systems, stored content distribution systems, content on demand distribution systems, internet streaming service systems, fixed medium distribution systems, and the like. In one embodiment, the content distribution system 101 may include a media content database configured to store media content provided by a media server or broadcaster in the case of a stored file based media content distribution system. It will be understood by those of ordinary skill in the art that this disclosure contemplates all known content distribution methods and systems, and that the disclosure is not to be limited to the embodiments and examples discussed herein.

Media content provided by the content distribution system 101 may include various forms of media which are distributed and consumed by end users, including video content, audio content, interactive media content, and the like. In preferred embodiments, the media content includes audio or video content. However, the disclosure is not limited thereto, and embodiments wherein the media content includes print media, interactive media, online internet content, mobile application content, and the like are also considered. By way of example, the media content provided by the content distribution system 101 may include video, audio, images, text, and combinations thereof related to television shows, movies, radio shows, music, news, podcasts, live content streaming, time-delayed programming, and the like. The content distribution system 101 may comprise one or more server computers and may further comprise or be operatively coupled to one or more hardware memory systems including a database for storing, accessing, and querying various stored media content for distribution. It will be understood by those of ordinary skill in the art that the content distribution system 101 includes multiple hardware components and may include multiple parties involved in the distribution of the media content, and this disclosure shall not be limited to a single component or single party content distribution system 101.

Referring back to FIG. 1, the system 100 further includes an output device 102 configured to receive the media content provided by the content distribution system 101 and to output the media content for consumption by a media consumer. In preferred embodiments, the output device 102 includes hardware configured to receive information of the media content, and to output the media content. By way of example, the output device may include televisions, computers, laptop computers, smartphones, tablet computers, radios, automobile consoles, satellite radios, internet content streaming devices, and the like. In certain embodiments, the output device 102 may include a separate media interface controller configured to connect to the content distribution system 101 to receive the media content to be output on the output device 102.

In an embodiment of the present disclosure, a provider of media content may create or identify a content trigger in media content, which triggers an action or function to be performed by a terminal external to the output device. Such functionality may be used to provide an interactive aspect to media while it is being consumed by a user. For example, a content provider of a television talk show may wish to enhance the viewing experience of a user by causing an object placed near the output device to light up or make a specific sound when a certain content trigger is recognized in the television talk show. In this example, the content trigger may be in the form of a certain word spoken by a character in the television talk show or a certain sound associated with the television talk show, however the disclosure is not limited thereto.

In other embodiments, content triggers may be in the form of perceptible or imperceptible data within the media content, including digital video fingerprints, audio fingerprints, video watermarks, audio watermarks, identifiable images or sounds, and the like. Such fingerprinting and watermarking techniques are well known and used in various automatic content recognition (ACR) implementations, and thus discussion thereof will be omitted for the purposes of this discussion.

In yet other embodiments, content triggers may be identified as specific portions of the media content itself, wherein no additional data is created or inserted into the media content. In such examples, a particular image, text, video frame, sound, word, or the like, of the media content may be identified and assigned by the content provider to act as the content trigger for a particular function. Further, where a word is assigned as a content trigger, the content provider may assign the word as text without specifying a particular sound associated with the word. Thereafter, the word may be recognized as the content trigger using voice or audio recognition techniques, as will be discussed in further detail below.

With continued reference to the example, the content provider may define a particular function to be associated with the content trigger, such that when the television talk show is viewed by a user, external terminals may be controlled to perform a particular action or function. The content provider may define the particular function and assign it to the corresponding content trigger to form a content-function association. For the purposes of this discussion, "content provider" may refer to any party involved in the production or distribution of the media content. Therefore, the content-function associations may be defined by a party who creates the content, such as a director of the television talk show, or a party who later distributes the finished content, such as a television network. However, the features of the present disclosure are not limited thereto, and this disclosure will be understood to refer to any party involved in the production, creation, and distribution of media content as the content provider.

Referring back to FIG. 1, the system further includes a content-function database 103 for storing information of the assigned content-function associations. The content-function database 103 may be configured to store information of the media content, content triggers, and the defined functions associated with the content triggers, as determined and defined by the content provider. The system may further include a terminal (not depicted) implementing an interface connected to the content-function database to allow the content provider to define and store and modify information stored in the content-function database 103. With reference to the television talk show example, the content-function database may store identifying information of the television talk show content, such as a content identifier (content ID), the content triggers identified within the television talk show, and function information associated with each content trigger, including function identifiers (function ID). In some embodiments, the content-function database may further store identifying information on various external terminals which are capable of performing the functions associated with the content triggers of a specific content identifier. Other embodiments of the system may include other information, or store the content-function information in various and multiple hardware configurations and via various components of the system, and it will be understood that these variations are additionally considered herein.

The system may further include an ACR server 104 configured to receive content information from the content distribution system 101 and the content-function database 103. The ACR server 104 may be configured to provide the content-function information to another party for use in recognizing content triggers during output of the media content in order to cause the functions to be performed. The ACR server 104 may be connected to a network 107, such as the internet, to transmit the content-function information.

With continuing reference to FIG. 1, the system may further include a controlling terminal 105 which connects to the ACR server 104 via the network 107 to receive content-function information. In an embodiment, the controlling terminal 105 may comprise a smartphone, or other personal electronic device. In other embodiments, the controlling terminal may be incorporated into other components of the system, such as the output device 102. By way of example, other embodiments of the controlling terminal may include cellular phones, televisions, computers, laptop computers, tablet computers, radios, automobile consoles, satellite radios, internet content streaming devices, dedicated controlling devices of the system, and the like. In the preferred embodiments, the controlling terminal 105 is capable of being positioned in proximity to the output device 102 which is outputting media content. The controlling terminal 105 may thus be placed in the same room or area to allow the controlling terminal 105 to receive information regarding the media content being output by the output device 102.

In certain embodiments, the controlling terminal is configured with communicating hardware to connect to the network 107 to transmit and receive information via the network, and may be further configured with a computing processor, memory, and output components such as a display, a speaker, and tactile feedback mechanisms to output information to a user.

In one embodiment, the controlling terminal 105 may be configured to execute stored application information or other computer readable medium. For example, where the controlling terminal 105 comprises a smartphone, the smartphone may be programmed to execute a stored application configured to interface with the ACR server 104 or other aspects of the system 100. The controlling terminal 105 may access the content-function information provided by the ACR server 104 via the network 107. The controlling terminal 105 may request the content-function information from the ACR server 104 at set time intervals, or may request the information when the request is initiated by a user of the controlling terminal. Alternatively, the ACR server 104 may be configured to initiate a transmission via a push update to the controlling terminal 105 when updated content-function information is available, or at set time intervals. In yet another embodiment, the controlling terminal 105 may be configured to automatically connect to the ACR server 104 and request content-function information related to media content that is currently being output. In this embodiment, the controlling terminal 105 may recognize and identify media content that is currently being output by the output device 102, and request content-function information from the ACR server 104 that is associated with the recognized media content.

When in the proximity of the output device 102, the controlling terminal 105 may receive information regarding the media content being output by the output device 102. The controlling terminal 105 may be configured with input devices configured to receive the information, such as microphones, cameras, motion sensors, accelerometer sensors, gyroscope sensors, and other input type devices. Accordingly, the controlling terminal 105 may receive information, such as audio of the television talk show being output by the output device 102. The received content information is processed by the controlling terminal 105 to recognize identifying features of the content information.

For example, the controlling terminal 105 may perform an audio or voice recognition process on the audio content information received via a microphone of the controlling terminal 105 to recognize certain words, phrases, or sounds to identify media content. In an embodiment where the media content includes a digital fingerprint or watermark, the controlling terminal may perform a fingerprint or watermark detection process to recognize and identify the media content, as is well known and used in the relevant art.

In some embodiments, the controlling terminal 105 may receive content information via the input devices and perform content recognition without being initiated by a user, or in other embodiments, the controlling terminal 105 may perform content recognition only in response to a user activating a content recognition function or executing an application implemented via computer readable medium to initiate the content recognition function.

Once the media content is being output via the output device 102, the controlling terminal may detect and receive content information from the output device 102 outputting the media content. In an embodiment as discussed above, the controlling terminal may have already received updated content-function information regarding the media content from the ACR server 104. Using the content-function information received from the ACR server 104, the controlling terminal 105 processes and recognizes certain aspects of the output media content, including digital fingerprints, watermarks, and content triggers. In addition, the controlling terminal 105 may continue to detect and receive information from the output media content in order to continuously identify the media content. This allows the controlling terminal 105 to recognize the same content trigger used for different contexts based on the media content currently being output.

An embodiment of the system of the present disclosure also includes one or more external terminals 106 which may comprise hardware and circuitry configured to communicate with the controlling terminal 105, and transmit and receive information with the controlling terminal 105. In some embodiments, the controlling terminal 105 and external terminals 106 may communication via wireless communication methods including Bluetooth, Wi-Fi, near field communication (NFC), and the like. In other embodiments, the external terminals may communicate with the controlling terminals via a network 107, such as the internet. In some embodiments, the external terminals may be further configured with a computing processor, memory, and output components such as a display, speaker, lights, or vibration motor to output information to a user.

In some embodiments, the controlling terminal 105 may control or cause the external terminals 106 to perform a particular function defined in the content-function information received from the ACR server 104 when a corresponding content trigger is detected in the media content being output by the output device 102. The controlling terminal may transmit an instruction signal to an external terminal 106 to perform the function in response to the content trigger.

In other embodiments, the controlling terminal 105 may transmit the instructions related to the particular function ahead of time prior to the content trigger. In such embodiments, the external terminal 106 may store the transmitted instructions in a memory, and may further include hardware configured to detect and receive the content information of the media content being output, such that the external terminal 106 recognizes a content trigger and performs the corresponding particular function.

In one embodiment, the controlling terminal 105 may be associated with a specific user, and the system 100 may be configured to store information regarding the specific users. The system 100 may include a user database (not depicted) configured to store identifying information of a particular user, along with information of a controlling terminal 105 associated with the identified user. In an example where the controlling terminal 105 comprises a smartphone, the identifying information may include a telephone number, an email address, a network subscriber identity module (SIM) identifier, or other unique identifying information allowing the system to determine and store identifying information of a particular user and the associated controlling terminal 105.

Alternatively, the system may include information uniquely identifying a particular user, wherein each user is associated with one or more controlling terminals 105, as in an example where a particular user owns a smartphone in addition to a tablet computer. Accordingly, the user database may be configured to store information to uniquely identify a particular user and one or more controlling terminals 105 associated with the particular user.

The ACR server 104 may be configured to require an authentication process of a controlling terminal prior to allowing access to information by the controlling terminal or prior to establishing a connection via an application executed by the controlling terminal. Such authentication may include various types of multi-factor authentication methods known and used in the relevant art. Additionally, the ACR server 104, or other server component of the system 100, may also be configured to determine, collect, and store information of the particular user, including demographic information as well as media consumption information and usage information related to the system 100. The user information may include personal information of the user such as age, gender, race, occupation, income, education level, and the like. The personal information may be provided by the user, the ACR server 104 may retrieve the personal information from information stored in a memory of the controlling terminal 105, or the ACR server 104 may connect to and access third party information related to the user, such as social networking websites, and the like.

Additionally, the ACR server 104 may store and collect usage information of the system 100 by the user. This usage information may include data related to the user's media content viewing preferences, such as most watched content, preferred content type, preferred content medium, preferred external terminal functions, preferred content consumption times and dates, and the like, wherein the information may be entered by a user or generated based on an analysis of historical usage data. Additionally, since a controlling terminal 105 may access the ACR server 104 in connection with any type of media content distribution independent of the delivery platform of the output device 102, the ACR server 104 will not be limited to collecting and storing usage information of the user on a single consumption platform, but will be able to determine and collect usage information of the particular user across all media consumption platforms. The usage information may also include information related to the various external terminals previously used and associated with the user.

The external terminal 106 may comprise a variety of devices configured to output information or perform an action perceptible to the user when the content trigger is output. By way of example, the external terminal may include a device having a speaker, a display, a light, a vibration motor, a wind generating fan, a heat generating motor or coil, a tactile feedback mechanism, a printer, and the like. In embodiments where the controlling terminal 105 transmits an instruction to perform a particular function, the external terminal 106 may include only components to receive the instructions from the controlling terminal 105 and perform the particular function, thereby minimizing the size and complexity of the external terminals. Alternatively, the external terminal may in turn control other devices or systems to implement to desired function output in response to control by the controlling terminal. For example, the external terminal may comprise a thermostat which controls a heating or cooling system in response to control by the controlling terminal.

The functions corresponding to the content triggers may include a variety of desired actions. The functions may be intended to enhance or complement the media content being output, such as by outputting a sound related to a story development of the media content, or by generating wind via a fan to match an environment depicted in the story of the media content. In other embodiments, the functions may be intended to emphasize an event or occurrence in the media content by grabbing the attention of a viewer, such as outputting a loud noise, flashing lights, or strongly vibrating a motor at a point of emphasis in the media content. In yet other embodiments, the functions may encourage further interaction or action by a viewer of the media content, such as by printing a ticket, coupon, map, or other information usable by a viewer to take further action corresponding to the media content being output.

Alternatively, the functions may be intended simply to match a similar terminal shown in the media content. For example, in the television talk show example, the television talk show may include an output device which outputs a particular sound and lights up in a particular color when a certain word or phrase is spoken. To match the output of the output device of the show, the external terminal of a user viewing the show may be configured to output the same sound and light up in the same way as the output device shown in the show in response to the word or phrase, defined as the content trigger in the content-function information.

Each function to be performed by an external terminal 106 may be identified using a function ID. In such embodiments, the ACR server 104 and the content-function database 103 may be configured to store one or more function ID's to be associated with a particular content trigger, where a content provider has assigned the function corresponding to the function ID to be performed in response to the particular content trigger. Accordingly, in an example, the content-function database may include a content ID associated with a particular media content, information of various content triggers identified within the media content (which may in turn include digital fingerprint identifiers, watermark identifiers, a timestamp, etc. as previously discussed), and one or more function ID's associated with each of the various content triggers within the media content.

Additionally, each external terminal may be identified using an external terminal ID ("terminal ID"), wherein each terminal ID is associated with one or more function ID's according to the function capabilities of the particular external terminal. Alternatively, each external terminal may be associated with a terminal class ID, wherein various forms of external terminals identified by the same terminal class ID are capable of performing a known set of common functions identified by the corresponding function IDs. In one embodiment of the system 100, the system 100 may further include a terminal-function database (not depicted) configured to store information related to external terminal or terminal class ID's and the corresponding function ID's to each external terminal according to the function capabilities of the external terminal. Further, the ACR server 104 may be operably connected to the terminal-function database and may provide terminal-function information to the controlling terminal 105.

In the above example, the controlling terminal 105 may identify or request identifying information such as terminal ID's from each of the external terminals 106 positioned in proximity to the output device 102 while media content is being output. The controlling terminal 105 may then provide the ACR server 104 with a request message including the terminal ID's. In response to the request message from the controlling terminal 105, the ACR server 104 may provide a response message to the controlling terminal 105 including the function ID's associated with each terminal ID as stored in the terminal-function database.

In some embodiments, when the request message to the ACR server 104 includes a content ID of the media content being output, the ACR server 104 may provide the controlling terminal 105 with content-function information including preconfigured instruction information corresponding to the entire media content, much like a script corresponding to the duration of the media content which is executable by the controlling terminal 105. Thus, the preconfigured instruction information may provide the instructions to be transmitted to each external terminal based on the media content associated with the content ID, the stored content triggers associated with the content ID, and the stored function ID's indicating the functions capable of being performed by the external terminals 106 located near the output device 102.

In another embodiment, the ACR server 104 may simply provide the controlling terminal with individual function information in the form of function IDs or function instructions capable of being performed by the external terminals associated with the terminal IDs provided to the ACR server 104. In such an embodiment, the controlling terminal 105 may receive the function information and determine the instructions to be sent to each external terminal 106 in response to the content triggers indicated in the content-function information additionally received from the ACR server 104.

It will be understood by those of ordinary skill in the art that these embodiments and examples are not limiting, and that a variety of external terminal device configurations, a variety of associated functions, and combinations thereof are contemplated by this disclosure. Further, it will be understood that the ACR server 104, the controlling terminal 105, the content-function database 103, and other components of the system 100 may be each configured in various embodiments and are not to be limited to the examples discussed above, such that instructions are provided to the external terminal 106 to perform a certain function when a corresponding content trigger is reproduced during output of media content.

Figure 2:
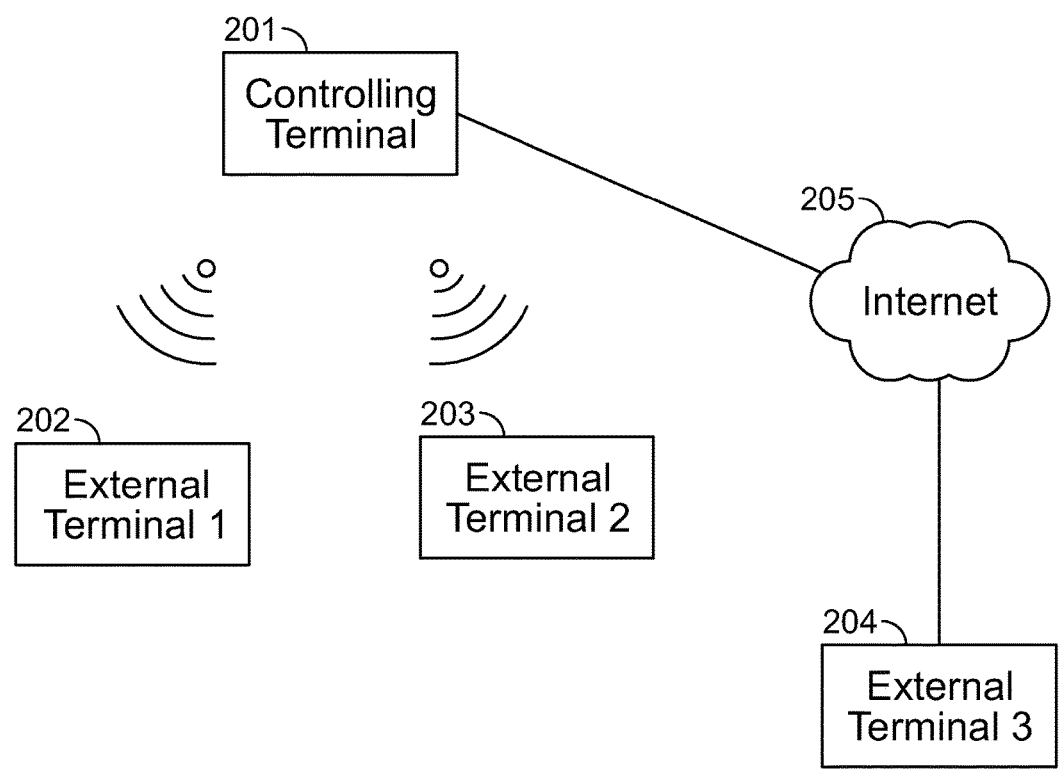
FIG. 2 is an illustration of a controlling terminal and a plurality of external terminals of a system in accordance with an embodiment of the present disclosure.

Referring now to FIG. 2, an aspect of the system including a controlling terminal 201 and a plurality of external terminals is depicted. In an embodiment of the system, the controlling terminal 201 may be in communication with a plurality of external terminals. Each of the plurality of external terminals 202, 203, 204 may be configured to perform different functions in response to a content trigger, either concurrently or at varying points in the media content.

For example, the controlling terminal 201 may control the external terminals 202, 203, 204 to perform various functions in response to the same content trigger in response to each instance of the content trigger. Alternatively, the controlling terminal 201 may control only a first external terminal 202 to perform a function in response to the first instance of the content trigger, only the second external terminal 203 to perform a function in response to the second instance of the content trigger, and so forth.

As previously discussed, the controlling terminal 201 may communicate with the external terminals 202, 203 via wireless communication protocols which are well known in the relevant art, such as Bluetooth, Wi-Fi, NFC, and the like. In other embodiments, the external terminal may communicate with the external terminal 204 via a network 205, such as the internet. In such configurations, the controlling terminal 201 may communicate and control the external terminal 204 positioned at a separate location or separated by a distance which renders shorter range communication protocols such as Bluetooth and NFC unusable.

In some embodiments, the controlling terminal 201 may perform other operations with respect to the external terminals 202, 203, 204. For example, the controlling terminal may perform maintenance and operational actions, such as turning on or off each external terminal, and requesting status information from each external terminal such as battery life, current location, current operating status, and the like.

Figure 3:
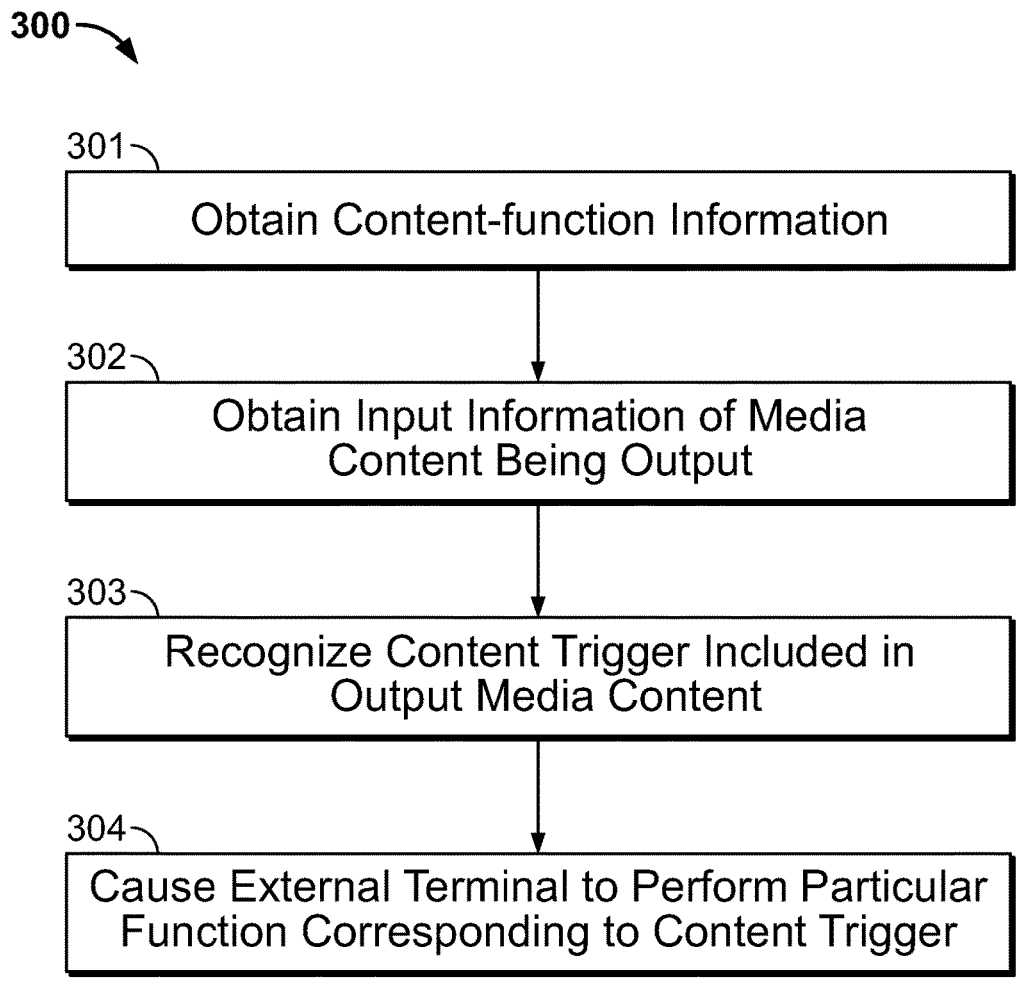
FIG. 3 is an illustration of a method for controlling output of a function in response to output of media content in accordance with an embodiment of the present disclosure.

FIG. 3 shows a flowchart including operations of a method 300 of an embodiment of the present disclosure for controlling output of functions in response to media content by a controlling terminal. The method 300 includes an operation at block 301 of obtaining content-function information from another party, such as receiving the content-function information from the ACR server as previously discussed with reference to FIG. 1. The content-function information may be obtained via a network, such as the internet, and may be obtained in response to initiation by the controlling terminal, initiation by the server, or at preset time intervals.

The method 300 further includes an operation at block 302 of obtaining input information of media content that is being output by an output device. The input information may include audio, video, images, text, or other information of the media content that is detected and received by the controlling terminal. The input information may be detected and received via various input components configured to receive inputs, such as microphones, cameras, sensors, and the like. The method 300 further includes an operation at block 303 of recognizing a content trigger included in the output media content. The input information may be used to perform automatic content recognition implementing various ACR techniques that are well known in the art, such as detecting digital fingerprints, watermarks, or audio or video recognition processes.

Further, the method 300 includes an operation 304 of causing an external terminal to perform a particular function corresponding to the content trigger. The controlling terminal may transmit an instruction to the external terminal to perform the function when the content trigger is recognized.

Figure 4:
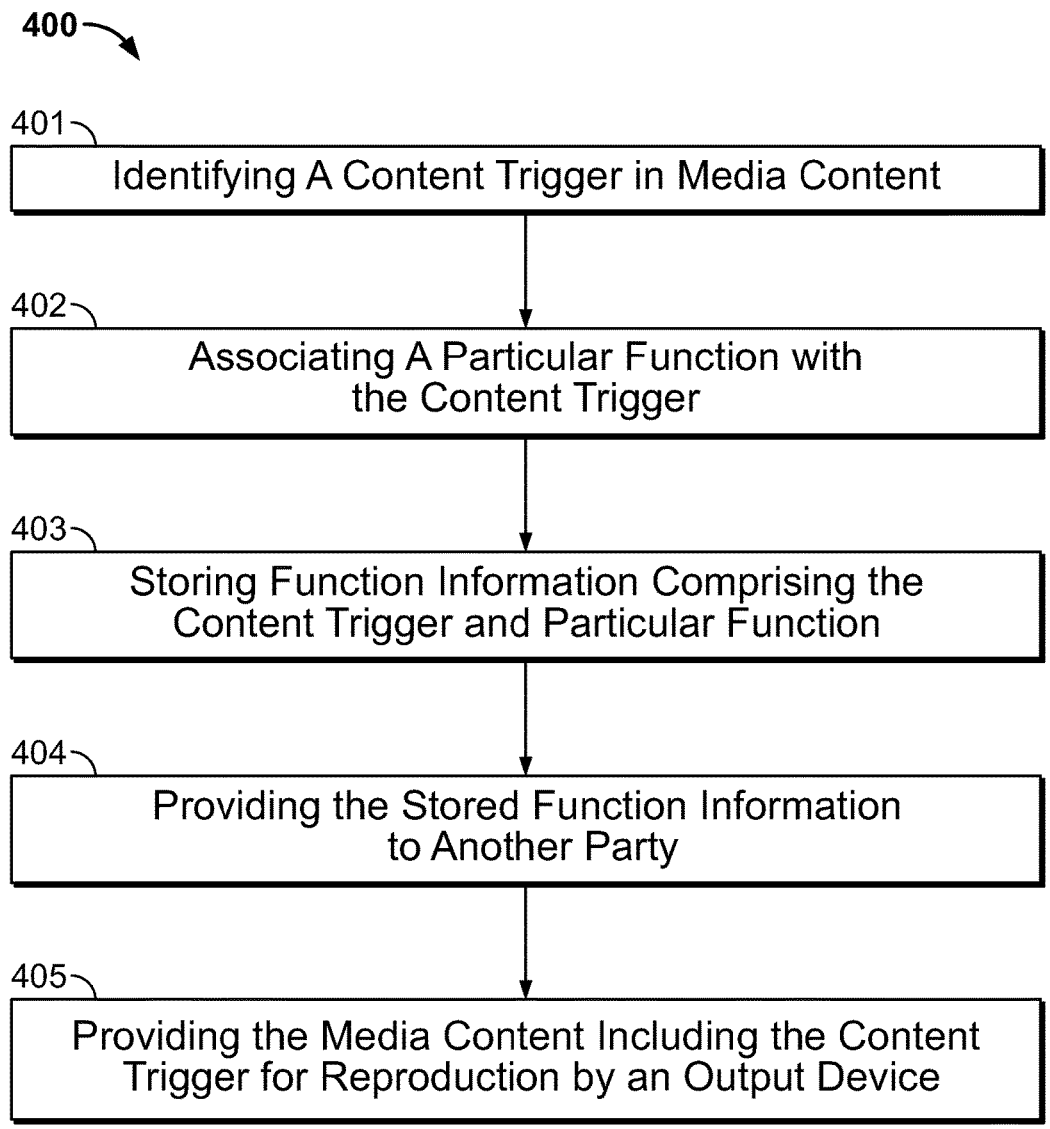
FIG. 4 is an illustration of another method for controlling output of a function in response to output of media content in accordance with an embodiment of the present disclosure.

Referring now to FIG. 4, another method 400 according to an embodiment of the present disclosure is presented. The method includes an operation 401 of identifying a content trigger in media content. The identifying of the content trigger may include identifying an existing portion of the media content as the content trigger, or may include generating and inserting content trigger information into the media content, such as generating and inserting a digital fingerprint or watermark.

The method 400 further includes an operation at block 402 of associating a particular function with the content trigger to be performed in response to the content trigger. In an embodiment, the operation 402 may include defining the function by generating computer readable medium executable by a controlling terminal or an external terminal to execute the defined function in response to the content trigger. Alternatively, the operation 402 may include information related to the function, wherein the instructions comprising computer readable medium are generated by another party.

The operation 403 of the method includes storing function information comprising the content trigger and the particular function. In an embodiment, the function information may be stored in a non-volatile memory of a system, wherein the memory is accessible by a server computer or by a requesting computer. The method 400 further includes an operation shown at block 404 of providing the stored function information to another party. The stored information may be provided in response to a request from the other party, the stored information may be provided at preset time intervals, or the stored information may be provided in response to an update to the stored information. The method 400 also includes an operation at block 405 of providing the media content including the content trigger for reproduction by an output device.

Features disclosed with respect to embodiments of the present invention may be suitable for use in systems for identifying content triggers included in media content, detecting content triggers included in media content when the media content is reproduced, and controlling the output of a function to be performed in response to recognizing the content trigger.

Other features disclosed with respect to embodiments of the present disclosure include controlling a controlling terminal to communicate with a plurality of external terminals, where the controlling terminal recognizes a content trigger in media content being output, and where the controlling terminal causes the plurality of external terminals to perform a function associated with the recognized content trigger.

According to embodiments of the present invention, a content provider providing media content, content triggers, and associated functions in a system may include one or more computer systems, computer processors, storage devices, distribution channels, etc., in order to store content-function information, provide media content, and identify content triggers within media content. Portions of the media content, content trigger information, and associated function information may reside in different locations, or may be distributed widely and coordinated with one another, particularly in a large organization. Moreover, particular portions may reside in entirely separate environments, such as content creators, advertisers, content distributors, etc.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

The various devices, modules, terminals, and the like discussed herein may be implemented on a computer by execution of software comprising machine instructions read from computer-readable medium. These hardware aspects may further include an input/output interface, graphical user interface, or other input/output means to allow the input/output of information related to controlling functions, inputting information, outputting information, receiving information, or transmitting information. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for controlling output of a function in response to media content, the method comprising:
receiving a portion of media content being output by an external output device;
determining identifying information of the media content based on the received portion of media content;
detecting an external terminal and receiving terminal identifying information from the external terminal;
transmitting a function information request message requesting function capabilities of the external terminal in connection with the media content, wherein the transmitted function information request message comprises the identifying information of the media content and the terminal identifying information of the external terminal;
in response to the transmitted function information request message, receiving function information related to the media content, wherein the received function information comprises a content trigger included in the media content and a particular function selected to match one or more function capabilities of the external terminal, wherein the particular function is to be performed at the external terminal in response to the content trigger;
detecting output of the content trigger during output of the media content by the external output device; and
transmitting instructions to the external terminal to perform the particular function in response to detecting the output of the content trigger by the external output device.

2. The method of claim 1, wherein receiving the portion of media content comprises capturing audio, video, or an image of the media content being output by the external output device.

3. The method of claim 1, wherein the content trigger comprises a portion of audio or video of the media content.

4. The method of claim 1, wherein the content trigger comprises at least an audio fingerprint, a video fingerprint, an audio watermark, or a video watermark.

5. The method of claim 1, further comprising repeatedly receiving additional function information related to the media content at preset intervals of time.

6. The method of claim 1, further comprising receiving the function information in response to a notification indicating that the function information has been updated.

7. The method of claim 1, wherein:
the function information comprises information related to a plurality of functions associated with the content trigger, each of the plurality of functions to be performed by a corresponding one of a plurality of external terminals; and
the method further comprises causing each of the plurality of external terminals to perform a corresponding function of the plurality of functions when the content trigger output by the external output device during output of the media content.

8. A method for providing media content linked to output of a function, the method comprising:
identifying a content trigger in the media content;
associating a plurality of functions with the content trigger, the plurality of functions to be performed by at least one external terminal in response to output of the content trigger included in the media content by an output device during output of the media content;
storing function information comprising the content trigger and the plurality of functions;
receiving a function information request message requesting function capabilities of the at least one external terminal in connection with the media content, wherein the transmitted function information request message comprises identifying information of the media content and terminal identifying information of the at least one external terminal;
determining one or more function capabilities of the at least one external terminal that are to be performed in connection with the media content based on the terminal identifying information;
determining one or more available functions of the stored function information that matches the determined one or more function capabilities to be performed at the at least one external terminal in connection with the media content;
providing information of the determined one or more available functions of the stored function information in response to the received function information request message, wherein the determined one or more available functions are to be performed at the at least one external terminal in response to output of the content trigger during output of the media content; and
providing the media content including the content trigger to enable output of the media content.

9. The method of claim 8, further comprising:
updating the stored function information;
determining whether the information of the determined one or more available functions of the stored function information is updated; and
providing updated information of the determined one or more available functions to a controlling terminal associated with the at least one external terminal.

10. The method of claim 8, wherein the content trigger comprises a portion of audio or video of the media content.

11. The method of claim 8, wherein the content trigger comprises at least an audio fingerprint, a video fingerprint, an audio watermark, or a video watermark.

12. The method of claim 8, further comprising:
receiving profile information related to a viewer of the media content; and
storing the received profile information to be associated with the media content.

13. The method of claim 12, wherein the received profile information comprises a unique identifier associated with the viewer.

14. A system for controlling output of a function in response to media content by a terminal, the system comprising:
a communication unit configured to transmit and receive information;
an input unit configured to receive information; and
a controller configured to:
receive a portion of media content being output by an external output device via the input unit;
determine identifying information of the media content based on the received portion of media content;
detect an external terminal and receiving terminal identifying information from the external terminal via the communication unit;
transmit, via the communication unit, a function information request message requesting function capabilities of the external terminal in connection with the media content, wherein the transmitted function information request message comprises the identifying information of the media content and the terminal identifying information of the external terminal;
receive, via the communication unit, function information related to the media content in response to the transmitted function information request message, wherein the received function information comprises a content trigger included in the media content and a particular function selected to match one or more function capabilities of the external terminal, wherein the particular function is to be performed at the external terminal in response to the content trigger;
detecting output of the content trigger during output of the media content by the external output device; and
transmitting instructions to the external terminal to perform the particular function in response to detecting the output of the content trigger by the external output device.

15. The system of claim 14, wherein:
the input unit comprises at least a camera configured to capture images or a microphone configured to capture audio; and
the received portion of media content comprises a captured image or a captured portion of audio of the media content output by the external output device.

16. The system of claim 14, wherein the content trigger comprises a portion of audio or video of the media content.

17. The method of claim 14, wherein the content trigger comprises at least an audio fingerprint, a video fingerprint, an audio watermark, or a video watermark.

18. The system of claim 14, wherein the controller is further configured to repeatedly receive additional function information related to the media content via the communication unit at present intervals of time.

19. The system of claim 14, wherein the controller is further configured to receive the function information via the communication unit in response to a notification indicating that the function information has been updated.

20. The system of claim 14, wherein:
the function information comprises information related to a plurality of functions associated with the content trigger, each of the plurality of functions to be performed by a corresponding one of a plurality of external terminals; and
the controller is further configured to cause each the plurality of external terminals to perform a corresponding function of the plurality of functions when the content trigger is output by the external output device during output of the media content.

21. The method of claim 1, wherein the transmitted instructions cause the external terminal to perform the particular function to match an occurrence depicted in the media content.

22. The method of claim 8, wherein the determined one or more available functions are to be performed at the at least one external terminal to match an occurrence depicted in the media content.

23. The system of claim 14, wherein the transmitted instructions cause the external terminal to perform the particular function to match an occurrence depicted in the media content.

24. The method of claim 21, wherein the occurrence corresponds to a similar terminal depicted in the media content performing the same particular function.

25. The method of claim 22, wherein the occurrence corresponds to a similar terminal depicted in the media content performing the same particular function.

26. The system of claim 23, wherein the occurrence corresponds to a similar terminal depicted in the media content performing the same particular function.

\* \* \* \* \*